Aug. 14, 1951 N. E. WAHLBERG 2,563,980
BEARING MOUNTING DEVICE
Filed May 27, 1944

INVENTOR.
N. E. WAHLBERG
BY Carl J. Barbee
HIS ATTORNEY

Patented Aug. 14, 1951

2,563,980

UNITED STATES PATENT OFFICE 2,563,980

BEARING MOUNTING DEVICE

Nils Erik Wahlberg, Chicago, Ill., assignor to Nash-Kelvinator Corporation, Kenosha, Wis., a corporation of Maryland Application May 27, 1944, Serial No. 537,759

4 Claims. (Cl. 308—184)

This invention relates to bearings and more particularly to means for mounting a bearing or bearings on a shaft without requiring the use of fastener elements such as set screws or similar fastening means.

This invention is especially adaptable to automobile drive shafts or propeller shafts. Due to the length of automobile drive or propeller shaft, it is usually necessary to provide a bearing or support near the midpoint of said shaft to reduce vibrations commonly called propeller shaft whip.

It is an object of this invention to provide a bearing mount that will be secured on the shaft without the necessity of machining a shoulder on said shaft.

It is a further object of this invention to use a prelubricated bearing that will last for the life of the automobile with little or no attention and without the necessity for periodic lubrication.

It is a further object of this invention to mount the bearing in a more economical manner and to employ more satisfactory means without requiring special machinery or fastener elements for the bearing.

Further objects and advantages of this invention will appear hereinafter as the description proceeds and will be more particularly pointed out in the appended claims.

In the drawings, of which there is one sheet and which are to be taken as illustrative rather than as limiting this invention:

Figure 1:
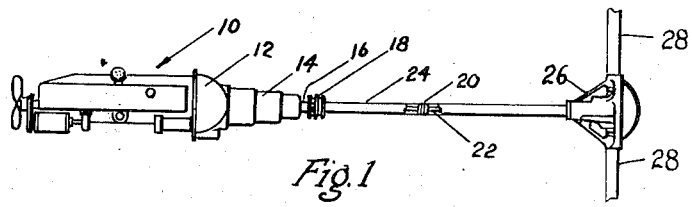
Figure 1 is a plan view of an automobile engine, clutch housing, transmission, universal joint, torque tube and rear axle, parts being broken away to show the invention as it is placed on the drive or propeller shaft.

Referring more in detail to the drawings, in which similar reference characters are used throughout to designate similar parts, the invention will be seen in Figure 1 to embody a bearing mounting device used in the transmission of power from an internal combustion engine generally indicated at 10 which transmits power generally through a clutch (not shown) enclosed in the clutch bell housing 12 to the transmission 14, to the transmission tail shaft 16, to the universal joint 18, thence to a drive shaft 22 enclosed in torque tube 24 and thus to the differential enclosed in the housing 26 where the power is transmitted through axle shafts (not shown) enclosed in axle shaft housings 28 to the wheels (not shown) of the vehicle. The bearing mount of the invention indicated generally at 20 is shown at or near the center of the drive shaft 22 through the cutaway portion of the torque tube 24 where its function is to minimize vibration caused by the transmission of power through a shaft of great length such as drive shaft 22.

Figures 2, 3:
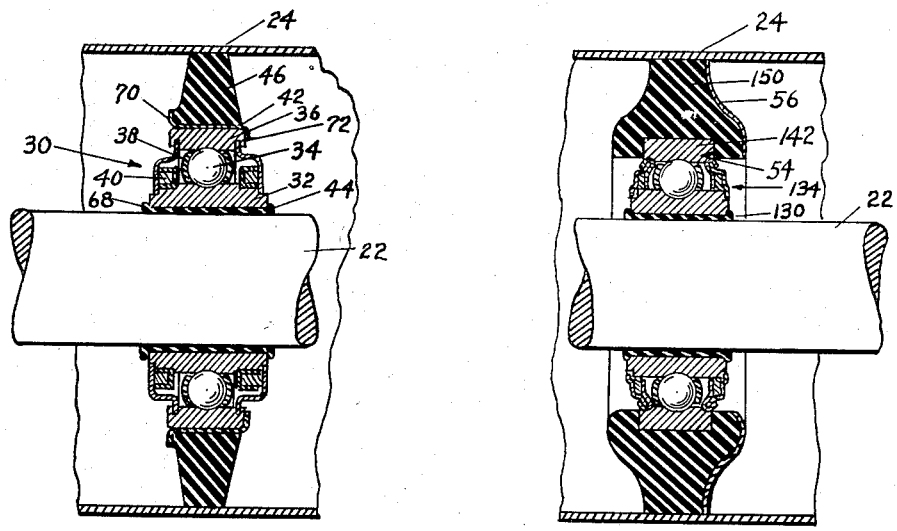
Figure 2 is a detailed, longitudinal, sectional view through the torque tube showing a cross section of the invention in its operating position.
Figure 3 is a sectional view similar to Figure 2 illustrating a modified form of the invention.

The invention 20 is shown in Figure 2, which is a longitudinal, sectional view through the torque tube 24 showing the drive shaft 22 on which is a washer 44 made of rubber or other elastic material having an outwardly extending flange 68 to abut against the inner race 32 of bearing 30 to keep the bearing from sliding past washer 44 during assembly. Washer 44 has an outside diameter slightly greater than the inside diameter of inner race 32 and its inside diameter is slightly less than the diameter of the shaft 22 to assure a tight fit between the shaft 22 and washer 44 and inner race 32.

Over washer 44 is placed an ordinary prelubricated bearing, indicated generally at 30, consisting of an inner race 32, a series of balls 34, prelubricating packing 40 retained on either side of the bearing 30, an outer race 36 and a retainer 38 holding and spacing balls 34. Around said prelubricated bearing 30 is press fitted the metal ring 42 having an outwardly extending flange 70 to function as a reinforce for the rubber collar 46 (to which ring 42 is vulcanized) and an inwardly turned flange 72 to function as a stop to limit the relative movement of ring 42 and the ring 42 is press fitted thereupon. Collar 46 has an outside diameter slightly greater than the inside diameter of tube 24 to insure a snug fit therebetween when assembled.

Prior to telescoping the bearing 30 over the shaft 22, the rubber collar 46 and its supporting ring 42 are pressed into position upon the outer race 36 of bearing 30, the inwardly directed flange 72 of the support element 42 functioning as a limit stop in the pressing operation.

The bearing and collar assembly is assembled to the shaft 22 by stretching washer 44 over shaft 22. Washer 44 may be coated with a lubricant such as a volatile liquid hydrocarbon (for example, carbon tetrachloride) to facilitate the assembly of the inner race 32, washer 44 and shaft 22. The friction existing between dry, clean rubber and dry, clean metal is relatively great and such friction creates considerable resistance to the assembling operation, particularly where the rubber is compressed and attenuated as in the present assembly. The liquid hydrocarbon also functions partially to dissolve the surface layer of rubber and, upon evaporation, aids in the formation of a permanent surface bond between the rubber and the metal.

When the bearing 20 is thus assembled, the drive shaft 22 with the bearing in place is pushed into correct position in torque tube 24. The collar 46 will quickly adjust itself to its proper position and having a greater diameter, will fit tightly inside torque tube 24 and thus hold bearing 30 firmly in operating position. The outer rubber collar 46 may be coated upon its perimeter with liquid hydrocarbon to facilitate assembly and assist in forming a bond between torque tube 24 and collar 46.

Figure 3 represents a modified form of the above described invention. The same type of bearing, 134, is used in this modified form, the washer 130 between the bearing 134 and drive shaft 22 being the same and the sequence of assembly being very similar. The modifications are in the shape and structure of the rubber or other elastic material collar 150. Instead of a metal ring vulcanized to collar 150 as at collar 46 in Figure 2, which was press fitted to outer race 36, the collar 150 has a groove 54 on its inner surface shaped to fit the outer surface of outer race 142 and form a natural bond therewith. Collar 150 is reinforced on one side with metal or fabric material 56 to keep its shape at all times.

The method of assembly is similar to that described under Figure 2 in that the washer 130 is placed on the shaft 22 and the bearing pushed over it or on the inner face of the bearing 134 and the collar 150 around the outer face of the bearing 134 and pushed on the lubricated shaft 22. However, when the drive shaft 22 and bearing assembly are inserted into the torque tube 24, they are inserted with the reinforced side of the collar 150 in leading position so said collar retains substantially its natural shape at all times.

Figures 4, 5:
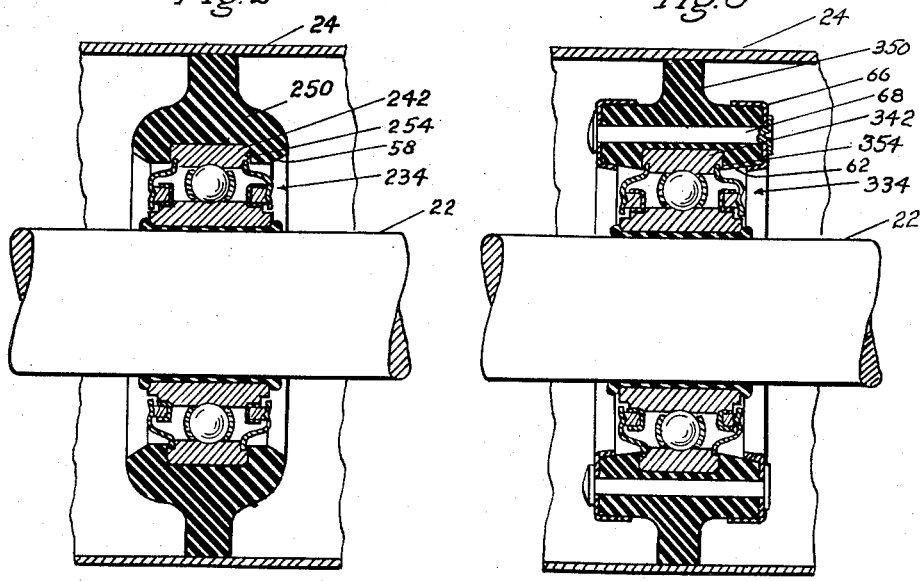
Figure 4 is a sectional view similar to Figure 2 illustrating a further modified form of the invention.
Figure 5 is a sectional view similar to Figure 2 illustrating a further modified form of the invention.

Figure 4 represents a further modified form of invention 20. The modification is in the form and structure of the collar. The collar 250 is similar in shape to collar 46 but has a chamfer 58 between its outer and inner surfaces, which makes it easier to insert the outer race 242 of bearing 234 into the groove 254, which is similar in shape and function to groove 54. Collar 250 is not reinforced, which permits its outer portion to bend away from the direction of movement as it is pushed into the torque tube, thus reducing friction between the collar 250 and torque tube 24 as the shaft 22 and invention are put in operating position. The method of assembly is the same as described as to Figure 3 except the mechanism may be inserted from either side.

Figure 5 represents a further modified form of invention 20. The modifications are in the form and structure of collar 350 as compared to collars 46, 150 and 250. Collar 350 is similar in shape to collars 150 and 250 but having a beveled inner surface 62 extending into the groove 354, which is similar to grooves 54 and 254. This beveled surface 62 makes it easier to insert the outer race 342 of bearing 334 into groove 354, thus replacing chamfer 58 of Figure 4. Collar 350 as reinforced on both sides by metal rings 66 held in place by rivets 68 through aligned, longitudinal apertures in said rings and collar 350. The method of assembly on shaft 22 and into torque tube 24 is identical to that of the invention shown in Figure 4, the outer portion of collar 350 bending away from the direction of insertion into torque tube 24 and said outer portion of collar 350 correcting its position quickly as the mechanism is operated.

This invention is an improvement on previous attempts to use bearings on these shafts in that a prelubricated bearing is used which eliminates the inconvenience and expense of periodic lubrication and eliminates costly repairs due to improper lubrication or to lubricants leaking out of the bearing reservoir which may result in burned out bearings and scored shafts.

The initial cost of manufacture is lessened because the bearing is mounted without the usual fastener elements and machined shoulder on the shaft.

This invention is not necessarily restricted to use on automobile drive shafts but can be adapted to line shafts of similar type.

While I have described my invention in some detail, I intend this description to be taken as an example only and not as a limitation of my invention, to which I make the following claims.

1. In combination, a shaft, a tube through which said shaft extends, an annular bearing member surrounding said shaft, a resilient washer compressed between said bearing member and said shaft, a ring press fitted on said bearing and having an inwardly extending flange abutting said bearing, and a resilient collar around said ring and extending to the inner wall of said tube for supporting said bearing.

2. In combination, a shaft, a tube through which said shaft extends, an annular bearing member surrounding said shaft, a resilient washer compressed between said bearing member and said shaft, a resilient collar around said bearing member and extending to the inner wall of said tube for supporting said bearing, and a ring between said collar and said bearing member, said ring being bonded to the inner surface of said collar and press fitted to the outer surface of said bearing member and having an outwardly extending flange abutting said collar and an opposite inwardly extending flange abutting said bearing member.

3. In combination, a shaft, a tube through which said shaft extends, a bearing member surrounding said shaft, a resilient washer compressed between said bearing member and said shaft, a resilient collar around said bearing member and extending to said tube for supporting said bearing and a ring between said collar and said bearing member, and said ring being bonded to said collar and press fitted on said bearing member.

4. In combination, a shaft, a tube through which said shaft extends, a bearing member surrounding said shaft, a resilient collar around said bearing member and extending to said tube for supporting said bearing, a ring between said collar and said bearing member, and said ring having an outwardly extending flange on its one end and an inwardly extending flange on its other end.

NILS ERIK WAHLBERG.

REFERENCES CITED

The following references are of record in the file of this patent:

UNITED STATES PATENTS

| Number | Name | Date |
|---|---|---|
| 1,198,559 | LeDuc | Sept. 19, 1916 |
| 2,007,152 | Alee | July 9, 1935 |
| 2,081,237 | Jantsch | May 25, 1937 |
| 2,070,081 | Henry | Feb. 9, 1937 |
| 2,092,291 | Olsen | Sept. 7, 1937 |
| 2,149,122 | McCall | Feb. 28, 1939 |
| 2,162,159 | Cole | June 13, 1939 |
| 2,173,250 | Fay | Sept. 19, 1939 |
| 2,193,549 | Chamberlain | Mar. 12, 1940 |
| 2,238,435 | Perry | Apr. 15, 1941 |

FOREIGN PATENTS

| Number | Country | Date |
|---|---|---|
| 525,432 | Great Britain | Aug. 28, 1940 |